US009547152B2

(12) United States Patent
Hatashita et al.

(10) Patent No.: US 9,547,152 B2
(45) Date of Patent: Jan. 17, 2017

(54) PLASTIC OPTICAL ELEMENT AND OPTICAL SCANNER AND IMAGING FORMING DEVICE INCLUDING THE SAME

(71) Applicants: Chieko Hatashita, Isehara (JP); Eiichi Hayashi, Atsugi (JP); Go Takahashi, Kawasaki (JP)

(72) Inventors: Chieko Hatashita, Isehara (JP); Eiichi Hayashi, Atsugi (JP); Go Takahashi, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/210,646

(22) Filed: Jul. 14, 2016

(65) Prior Publication Data
US 2016/0320591 A1  Nov. 3, 2016

Related U.S. Application Data

(62) Division of application No. 13/617,149, filed on Sep. 14, 2012.

(30) Foreign Application Priority Data

Sep. 15, 2011 (JP) ................................ 2011-201744

(51) Int. Cl.
| | |
|---|---|
| G02B 26/08 | (2006.01) |
| G02B 13/00 | (2006.01) |
| G02B 1/04 | (2006.01) |
| G02B 26/12 | (2006.01) |
| G03G 15/043 | (2006.01) |

(52) U.S. Cl.
CPC ........... *G02B 13/0005* (2013.01); *G02B 1/041* (2013.01); *G02B 26/125* (2013.01); *G03G 15/043* (2013.01)

(58) Field of Classification Search
CPC . G02B 13/0005; G02B 26/123; G02B 27/125; G02B 3/0031; B41J 2/473
USPC ..................................... 359/205.1–208.2, 662
See application file for complete search history.

(56) References Cited

U.S. PATENT DOCUMENTS

| | | | |
|---|---|---|---|
| 6,015,514 | A | 1/2000 | Koseko |
| 8,743,444 | B2 | 6/2014 | Miyatake et al. |
| 2001/0032925 | A1 | 10/2001 | Itabashi |
| 2002/0097475 | A1 | 7/2002 | Koreeda et al. |
| 2003/0128412 | A1 | 7/2003 | Iizuka et al. |
| 2003/0206323 | A1 | 11/2003 | Itabashi |

(Continued)

FOREIGN PATENT DOCUMENTS

| | | |
|---|---|---|
| JP | H11-028745 | 2/1999 |
| JP | 2001-264665 | 9/2001 |

(Continued)

OTHER PUBLICATIONS

Office Action issued in Japanese Patent Application No. 2011-201744 on May 26, 2015.

*Primary Examiner* — James Phan
(74) *Attorney, Agent, or Firm* — Oblon, McClelland, Maier & Neustadt, L.L.P.

(57) ABSTRACT

A plastic optical element for an optical system of an optical scanner includes a plurality of optical effective portions through which a plurality of light beams transmit, respectively, formed on at least one of an incidence surface and an exit surface in a sub scan direction, and an optical ineffective portion formed between neighboring optical effective portions not to allow the light beams to transmit therethrough, and including an area in which a local contraction occurs at a time of resin molding.

7 Claims, 13 Drawing Sheets

(56) References Cited

U.S. PATENT DOCUMENTS

| | | |
|---|---|---|
| 2004/0174581 A1 | 9/2004 | Iizuka et al. |
| 2005/0024723 A1 | 2/2005 | Koreeda et al. |
| 2006/0262372 A1 | 11/2006 | Hayashi |
| 2007/0216983 A1 | 9/2007 | Hayashi et al. |
| 2008/0049287 A1 | 2/2008 | Kimura et al. |
| 2008/0112054 A1 | 5/2008 | Seko |
| 2009/0073580 A1 | 3/2009 | Hayashi et al. |
| 2009/0168188 A1 | 7/2009 | Takahashi et al. |
| 2009/0231410 A1 | 9/2009 | Hayashi et al. |
| 2010/0046055 A1 | 2/2010 | Tomioka |
| 2011/0304896 A1 | 12/2011 | Takahashi et al. |

FOREIGN PATENT DOCUMENTS

| | | |
|---|---|---|
| JP | 2002-160268 | 6/2002 |
| JP | 2003-005114 | 1/2003 |
| JP | 2006-133709 | 5/2006 |
| JP | 2008-015139 | 1/2008 |
| JP | 2009-222934 | 10/2009 |
| JP | 2010-049061 | 3/2010 |
| JP | 2011-81369 | 4/2011 |

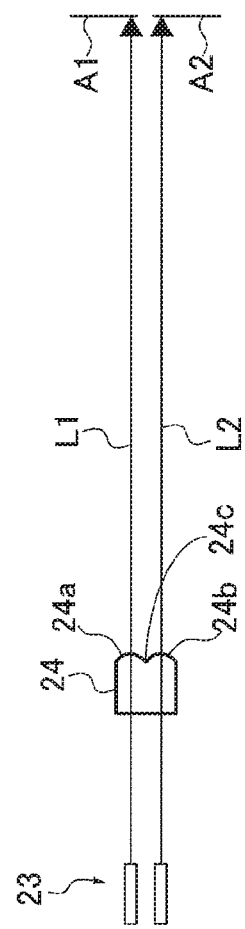

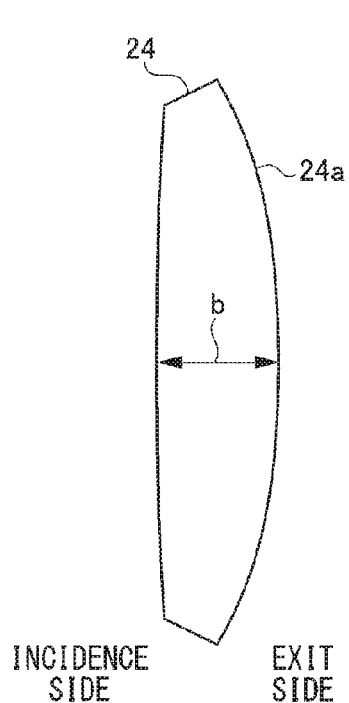
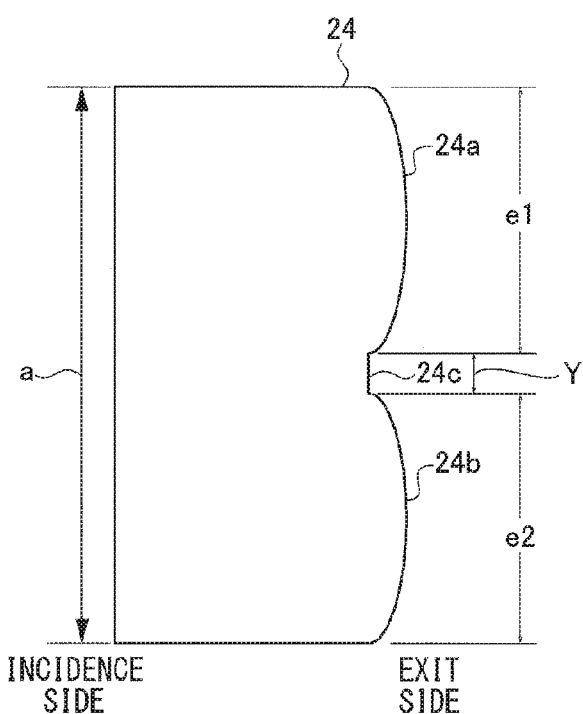
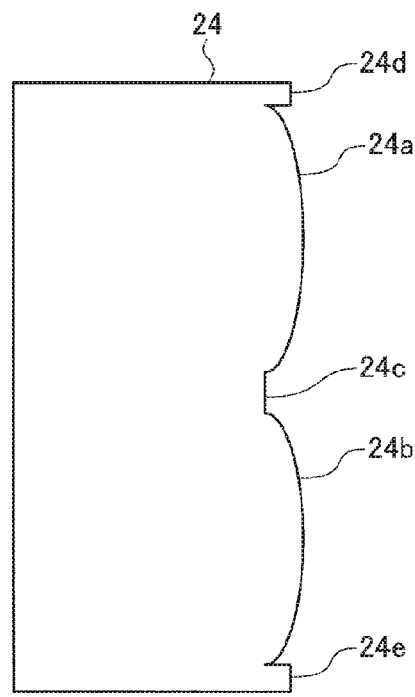

PLASTIC OPTICAL ELEMENT AND OPTICAL SCANNER AND IMAGING FORMING DEVICE INCLUDING THE SAME

CROSS REFERENCE TO RELATED APPLICATIONS

The present application is a division of U.S. application Ser. No. 13/617,149 filed Sep. 14, 2012, which is based on and claims priority from Japanese Patent Application No. 2011-201744 filed on Sep. 15, 2011, the entire contents of each of which are hereby incorporated by reference in their entirety.

BACKGROUND OF THE INVENTION

Field of the Invention

The present invention relates to a plastic optical element used in the optical system of an image forming device such as a laser copier, laser printer, facsimile machine, plotter, or complex machine with two or more functions. It also relates to an optical scanner including such a plastic optical element and an image forming device including such an optical scanner.

Description of the Related Art

To adapt for high-speed image outputs, a tandem-type, electrophotographic full-color image forming device in which four photoreceptor drums are arranged with a certain interval has been popular.

In such a tandem type image forming device, the light beams from light sources of an optical scanner or a laser write unit are deflected by a single optical deflector to concurrently expose the surfaces of photoreceptor drums via respective optical scan systems and generate latent images thereon. The latent images are visualized by develop units containing four colors of toner and the four color toner images are transferred onto a paper to form a full color image.

Recently, there have been demands for downsizing and cost reduction of such a tandem type image forming device and an optical scanner. For example, Japanese Patent Application Publication No. 2008-15139 discloses an optical scanner configured to make two light beams incident obliquely on the surface of the optical deflector vertical to the rotation axis and exit from a single optical system to converge on the surfaces of two photoreceptor drums.

Thus, providing only two optical systems for four photoreceptor drums can contribute to reducing the size of the optical scanner.

The optical scanner in the above document includes a combined optical element having two optical effective portions and one optical ineffective portion between the optical effective portions not to allow light transmission. The optical effective and ineffective portions are set such that a distance from a line connecting the apexes of the two optical effective portions to the apex of the optical ineffective portion on the sub scan cross section is to be 1.0 mm or less.

A plastic optical element having two optical effective portions and an optical ineffective portion therebetween can be manufactured by injection molding of melted resin into a mold cavity. During the cooling process of the injection molding, the surface of the plastic optical element is likely to be pulled toward the center with a relatively high temperature due to resin contraction.

A part of the optical effective portions near the optical ineffective portion in sub scan direction is located closer to the center having a high temperature than the rest of the portions. Thus, this part of the optical effective portions is largely affected by thermal contraction of the center area. Because of this, a large local contraction occurs therein, which may cause degradation in mold transferability.

FIG. 15A schematically shows the side surface of a plastic optical element 100 in sub scan direction. The plastic optical element includes two optical effective portions 101, 102 and an optical ineffective portion 103 therebetween on an exit side. FIG. 15B is a graph showing a result of measuring transferability error in the position of the optical surface in sub scan direction. The transferability error refers to a difference between the surface shapes of a mold and a molded product. In FIG. 15B the abscissa axis shows the position of the optical surface in sub scan direction on the exit side (mm) while the longitudinal axis shows transferability error (mm). The position zero is the center of the optical ineffective portion 103.

In FIGS. 15A, 15B, a shift in the position of the optical surface from a mold to a molded product from the incidence side to the exit side is defined to be positive. FIG. 15B shows that resin contraction increases as the shift goes negative in the longitudinal axis. The transferability error is negatively large around the optical ineffective portion 103, that is, the area D in FIG. 15B. It is confirmed that the contraction amount of about the portion 103 is larger than the rest of the surface.

FIG. 16A schematically shows the side surface of a plastic optical element 100a in sub scan direction. The plastic optical element includes two optical effective portions 101a, 102a and an optical ineffective portion 103a therebetween on an incidence side. FIG. 16B is a graph showing a result of measuring transferability error in the position of the optical surface in sub scan direction. In FIG. 16B the abscissa axis shows the position in sub scan direction (mm) on the incidence side while the longitudinal axis shows transferability error (mm). The position zero is the center of the optical ineffective portion 103a.

In FIGS. 16A, 16B, a shift in the position of the optical surface from a mold to a molded product from the incidence side to the exit side is defined to be positive. FIG. 16B shows that resin contraction increases as the shift goes positive in the longitudinal axis. The transferability error is negatively large around the optical ineffective portion 103a, that is, the area D in FIG. 16B. It is confirmed that the contraction amount of about the portion 103a is larger than the rest of the surface.

In FIGS. 15B, 16B at the transferability error being zero, the element surface is in an ideal state.

To further downsize the optical scanner, the length of the optical ineffective portion of the plastic optical element in sub scan direction needs to be shortened. However, there is a problem that the optical characteristics of a potion of the optical effective portions near the optical ineffective portion deteriorates due to a decrease in mold transferability, which leads to a degradation in beam spot shape on a target scan plane.

SUMMARY OF THE INVENTION

The present invention aims to provide a plastic optical element which comprises a shorter-length optical ineffective portion disposed between two optical effective portions and can maintain good optical characteristics of the portion of the optical effective portions near the optical ineffective portion. It also aims to provide an optical scanner and an image forming device incorporating such a plastic optical element.

According to one embodiment, a plastic optical element for an optical system of an optical scanner comprises a plurality of optical effective portions through which a plurality of light beams transmit, respectively, formed on at least one of an incidence surface and an exit surface in a sub scan direction, and an optical ineffective portion formed between neighboring optical effective portions not to allow the light beams to transmit therethrough, and including an area in which a local contraction occurs at a time of resin molding.

BRIEF DESCRIPTION OF THE DRAWINGS

Features, embodiments, and advantages of the present invention will become apparent from the following detailed description with reference to the accompanying drawings:

FIG. 3 is a side view of the essential part of another example of optical scanner in sub scan direction;

FIGS. 4A, 4B are a flat view and a side view of an fθ lens of the optical scanner in main and sub scan directions according to the first embodiment, respectively;

FIG. 5 is a side view of another example of fθ lens in sub scan direction;

DETAILED DESCRIPTION OF EMBODIMENTS

Hereinafter, embodiments of the present invention will be described in detail with reference to the accompanying drawings. Wherever possible, the same reference numbers will be used throughout the drawings to refer to the same or like parts.

First Embodiment

Figure 1:
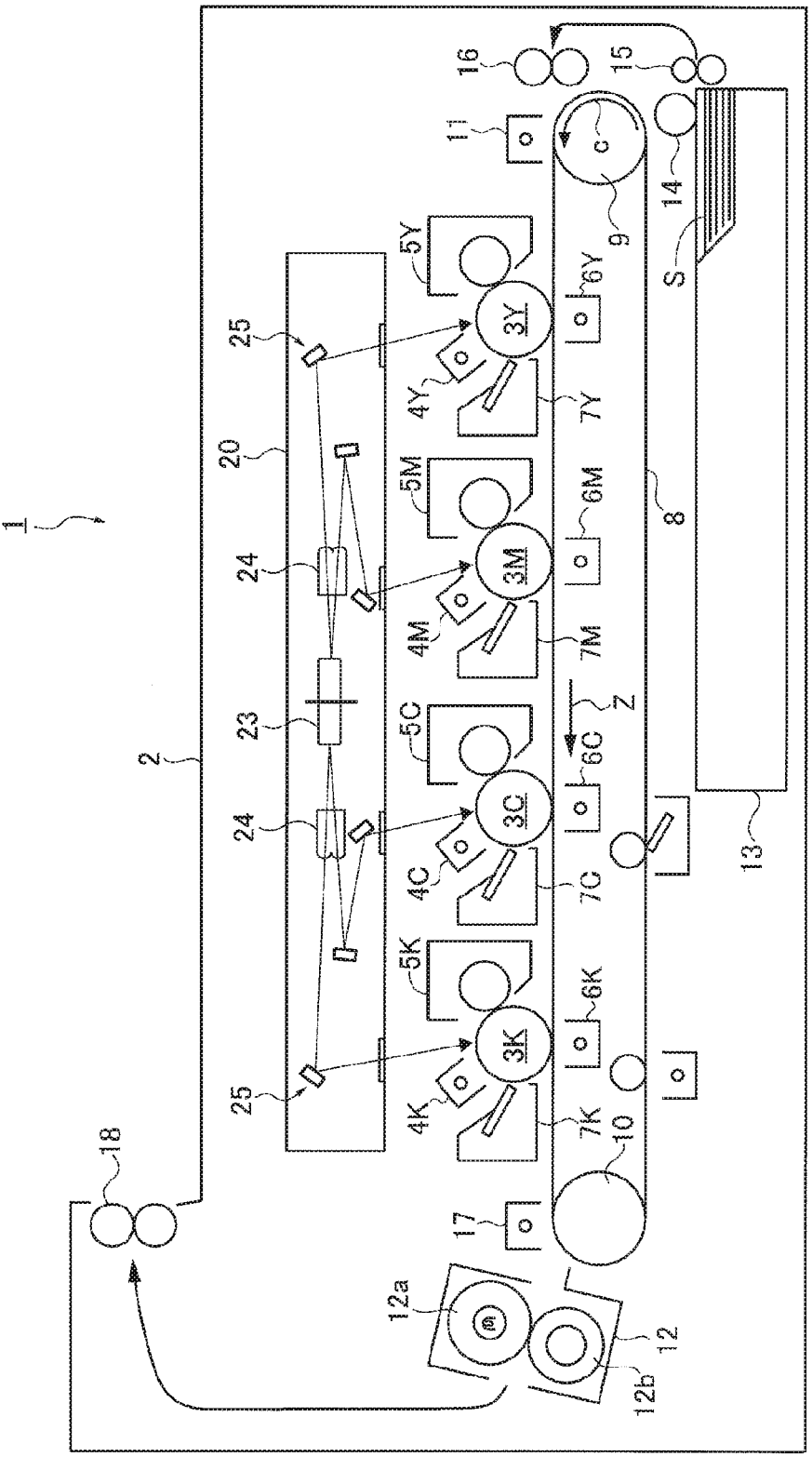
FIG. 1 schematically shows the structure of an image forming device including an optical scanner according to a first embodiment of the present invention.

FIG. 1 schematically shows an image forming device comprising an optical scanner according to a first embodiment of the present invention. The present embodiment describes an example where the plastic optical element is used as an fθ lens of an optical system of the optical scanner.

FIG. 1 shows a tandem type image forming device 1 as a full color laser printer. A device body 2 includes four photoreceptor drums 3Y, 3M, 3C, 3K arranged with a predetermined spacing, electric chargers 4Y, 4M, 4C, 4K, develop elements 5Y, 5M, 5C, 5K, transfer elements 6Y, 6M, 6C, 6K, and cleaning elements 7Y, 7M, 7C, 7K disposed around the photoreceptor drums, respectively, and a no-end carrier belt 8 between the photoreceptor drums 3Y to 3K and the transfer elements 6Y to 6K.

The carrier belt 8 is extended over a drive roller 9 and a driven roller 10 to be rotated in the direction of the arrow X by the drive roller 9. A paper sheet S is attached onto the surface of the carrier belt 8 by static electricity by an electric charger 11 and carried.

A fuser 12 including a fuse roller 12a and a pressure roller 12b is disposed at downstream of a paper forwarding direction near the driven roller 10. An optical scanner 20 is provided above the photoreceptor drums 3Y to 3K to expose the surfaces (target scan surfaces) of the photoreceptor drums 3Y to 3K with a laser beam on the basis of image information.

The optical scanner 20 comprises a light source 21, an optical system 22 (FIG. 2A), an optical deflector 23 as a polygon mirror, an fθ lens 24 as a plastic optical element, and mirrors 25. The optical scanner 20 including the fθ lens 24 is described in detail later.

To form images with the image forming device 1, the surfaces of the photoreceptor drums 3Y, 3M, 3C, 3K are uniformly charged by the electric chargers 4Y, 4M, 4C, 4K, respectively. Then, the surfaces thereof are scanned with a laser beam from the optical scanner 20 according to image information input via a not-shown controller, to form, electric latent images.

The electric latent images on the photoreceptor drums 3Y to 3K are developed by the develop elements 5Y, 5M, 5C, 5K and visualized as a toner image of four colors (yellow magenta, cyan, black).

Meanwhile, paper sheets S in a paper cassette 13 are fed one by one by a feed roller 14 and a carrier roller pair 15 and sent by a resist roller pair 16 to the rotating carrier belt 8 at a certain timing. Then, the paper sheet S is electro-statically attached on the surface of the carrier belt 8 charged by the electric charger 11 and carried to the photoreceptor drum 3Y along with the rotation of the carrier belt 8.

The yellow toner image on the photoreceptor drum 3Y is transferred to a portion between the photoreceptor drum 3Y and the transfer element 6Y concurrently with the paper S, thereby transferring the yellow toner image onto the paper sheet S by the transfer element 6Y applied with a transfer bias. Likewise, magenta, cyan, black toner images on the photoreceptor drums 3M, 3C, 3K are superimposed in sequence on the paper S to form a full color image.

The carrier belt 8 is applied with charge with reverse polarity by an electric charger 17 to separate the paper S from the surface of the carrier belt 8 and carry it to the fuser 12. The full color toner image is fused on the paper S by applying heat and pressure to the paper S by a fuse nip between the fuse roller 12a and the pressure roller 12b. Then, the paper S is discharged to a paper tray via a discharge roller pair 18.

Figures 2A, 2B:
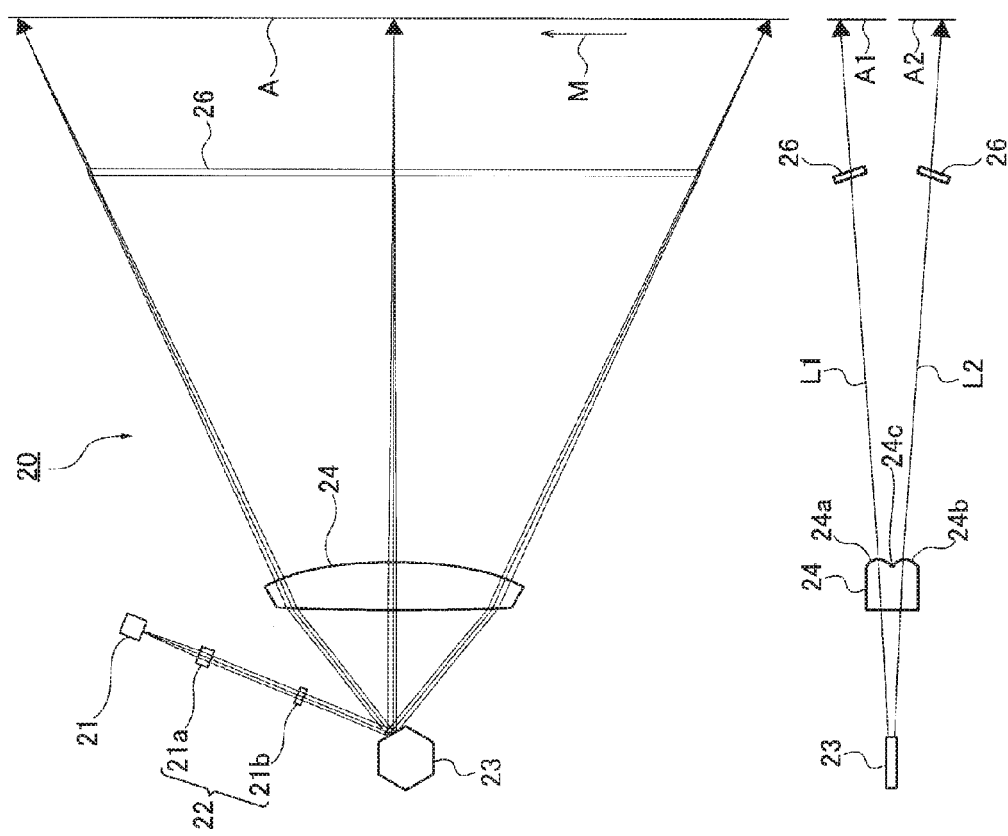
FIGS. 2A and 2B are a flat view and a side view of the essential part of the optical scanner in main and sub scan directions, respectively.

FIGS. 2A, 2B are a flat view and a side view of the essential part of the optical scanner 20 in main and sub scan directions, respectively. Note that the main scan direction refers to a direction indicated by the arrow M in FIG. 2A in which a target scan surface A, that is, the surface of the photoreceptor drum, is scanned with beam spots. The sub scan direction refers to a direction orthogonal to the main scan direction.

The optical scanner 20 in FIG. 2A comprises the light source 21 as a semiconductor laser, the optical system 22 including a coupling lens 22a and a cylindrical lens 22b, the optical deflector 23 as a polygon mirror, the fθ lens 24 as a plastic optical element, and optical elements 26. The mirrors 25 in FIG. 1 are omitted from FIG. 2A, 2B.

The laser beam is emitted from the light source 21, converted into a parallel light by the coupling lens 22a, converged in the sub scan direction by the cylindrical lens 22b, and incident on the surface of the optical deflector 23. The coupling lens 22a can be configured to convert the laser beam to one with a low divergence or convergence.

Then, along with the rotation of the optical deflector 23 at equal angular velocity, the laser beam is equiangurlarly deflected by the surface of the optical deflector 23, transmitted through the fθ lens 24 and the optical elements 26, and reaches the target scan surface A. The light beam transmitted through the fθ lens 24 scan the target scans surface A at equal velocity in the main scan direction. The fθ lens 24 functions to convert the deflected light beam to form beam spots on the target scan surface A.

As shown in FIG. 2B, the fθ lens 24 includes, on exit side, two optical effective portions 24a, 24b arranged in the sub scan direction and an optical ineffective portion 24c between the optical effective portions 24a, 24b. The optical effective portions 24a, 24b in convex form are disposed to allow two laser beams L1, L2 to transmit therethrough and travel to different scan surfaces A1, A2, respectively. Also, the laser beams L1, L2 deflected by the optical deflector 23 are obliquely incident on the other side of the fθ lens 24.

The optical deflector 23 can be configured to have two deflection surfaces to deflect the laser beams L1, L2 to be incident in parallel on the optical effective portions 24a, 24b of the fθ lens 24, respectively, as shown in FIG. 3.

Thus, the single fθ lens 24 can be used for the two target scan surfaces A1, A2. Only two fθ lenses 24 are needed for the four photoreceptor drums 3Y, 3M, 3C, 3K of the tandem type image forming device.

Thereby, it is possible to reduce the number of fθ lenses to half from two fθ lenses disposed in sub scan direction for two photoreceptor drums of the prior art device, leading to downsizing the optical scanner and reducing the cost thereof.

FIG. 4A, 4B are a flat view and a side view of the fθ lens 24 in the main and sub scan directions, respectively. In the drawings the left side of the fθ lens 24 (near the optical deflector) is a light incidence side while the right side thereof (near the target scan surface) is a light exit side.

As shown in FIG. 4B, the fθ lens 24 made from resin includes, on the exit side, the two convex optical effective portions 24a, 24b and the flat optical ineffective portion 24c therebetween in the sub scan direction. The surfaces of the optical effective portions 24a, 24b from which a laser beam projects are referred to as optical surface below. The optical effective and ineffective portions can be provided on the incidence side instead of the exit side.

Further, the fθ lens 24 can include ribs 24d, 24e outside the optical effective portions to protect the optical surface, as shown in FIG. 5.

As described above in the Background of the Invention section, for the purpose of further downsizing the optical scanner, the length of the optical ineffective portion 24c in the sub scan direction has to be shortened. However, if the optical effective portions 24a, 24b include a local large contraction near the optical ineffective portion 24c, the mold transferability thereof is likely to lower.

Due to the lowered mold transferability, the convex shape of the optical effective portions 24a, 24b is undulated and different from an expected shape. The undulated optical surface deteriorates wave aberration, resulting in deteriorating beam spot size on the target scan surfaces or the surfaces of the photoreceptor drums. Furthermore, depending on the positions of the optical effective portions 24a, 24b through which light transmits, field curvature occurs because of a local curvature change and also degrades the beam spot size.

In view of the above, the fθ lens 24 is configured that the optical ineffective portion 24c includes a large local contraction area, so as to prevent a degradation in the mold transferability of the portion of the optical effective portions 24a, 24b.

With resin contraction during the cooling process of injection molding of the fθ lens 24 taken into account, the optical ineffective portion 24c is located near the center of the exit surface with a higher temperature than the rest of the surface, therefore, it is largely affected by thermal contraction. Because of this, a large local contraction occurs around the portion of the optical effective portions 24a, 24b close to the optical ineffective portion 24c, leading to lowering the mold transferability.

Therefore, it is necessary to form the optical effective portions 24a, 24b in an area less affected by the thermal contraction of the center or free from local contraction. That is, the optical ineffective portion 24c needs to be formed to include the large local contraction area to prevent a decrease in the mold transferability.

Referring to FIGS. 4A, 4B, the optical ineffective portion 24c of the fθ lens 24 is formed to have a length Y in the sub scan direction which satisfies the following relation (1):

$$Y > 0.3(a*b)/(a+b)-1.1$$

where "a" is the thickness of the fθ lens 24 in the sub scan direction and "b" is the thickness thereof along the optical axis (hereinafter, thickness along the optical axis).

The above relation is described in detail. As apparent from FIG. 4B, the thickness "a" in sub scan direction is expressed by $$a = Y + (e1 + e2)$$

where e1 and e2 is the lengths of the surfaces of the optical effective portions 24a, 24b in sub scan direction, respectively.

Thus, when the lengths e1 and e2 of the optical effective portions 24a, 24b and the thickness b along the optical axis are known, the length Y of the optical ineffective portion 24c to set is found by the above relation (1).

Figure 6:
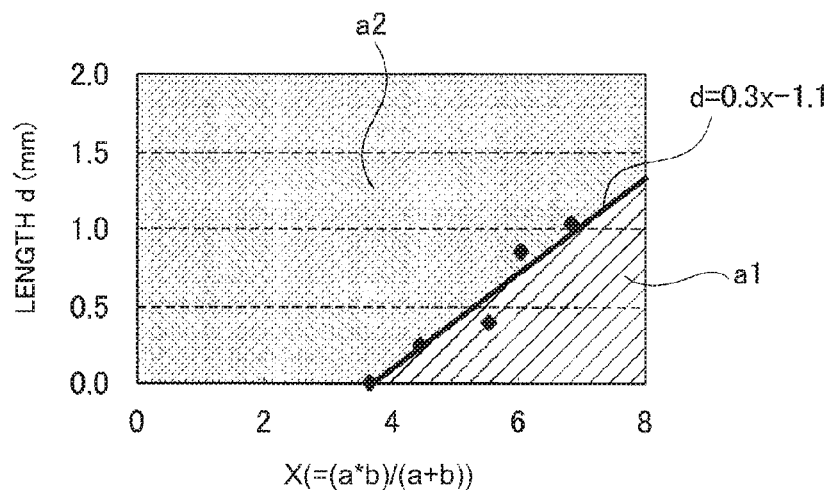
FIG. 6 is a graph showing the results of simulation and an actual mold in which a length of a local contraction near an optical ineffective portion was measured.

The invertors of the present invention actually created, by injection molding, fθ lenses as shown in FIGS. 4A, 4B with different thicknesses in sub scan direction and thicknesses along the optical axis. They also conducted computer simulation to examine a length of local contraction around the optical ineffective portion. FIG. 6 shows the results of the actual molding and the simulation.

Figure 7:
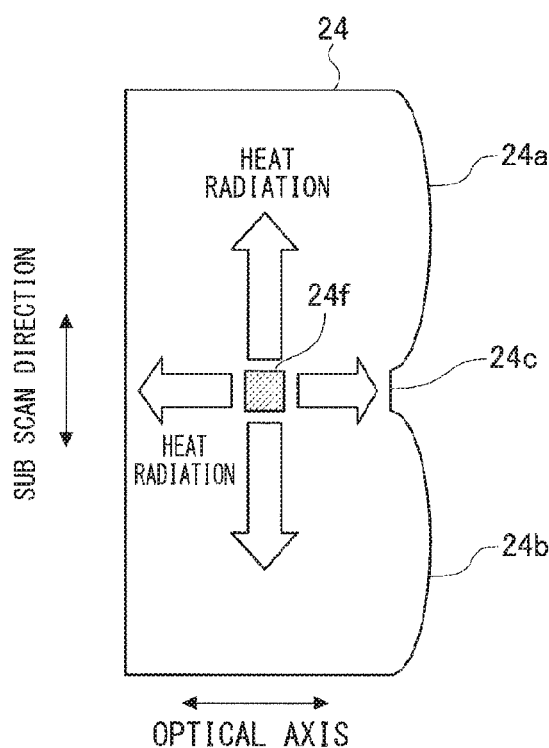
FIG. 7 shows heat discharge directions in the vicinity of the center of the fθ lens.

In the abscissa axis of the graph in FIG. 6, (a*b)/(a+b) is a function to represent the heat retaining tendency of the center 24f of the fθ lens 24 shown in FIG. 7. The longitudinal axis shows the length d of local contraction near the optical ineffective portion. As the heat retaining tendency (difficulty in heat radiation) inside the lens increases, the influence of thermal contraction on the lens center 24F increases and so does the length of local contraction near the optical ineffective portion 24c.

Accordingly, the length of local contraction near the optical ineffective portion is correlated with the heat retaining tendency of the lens center 24f. The heat retaining tendency depends on the heat radiation of resin to a mold and the heat radiation depends on a lens shape. As shown in FIG. 7, heat radiates around the center 24f of the fθ lens 24 in the sub scan direction and axial direction.

In FIG. 7 the temperature of the lens center 24f exponentially decreases over time. The decrease time is proportional to (a*b)/(a+b) and the larger the decrease time, the higher the heat retaining tendency of the lens center 24f.

Figure 8A:
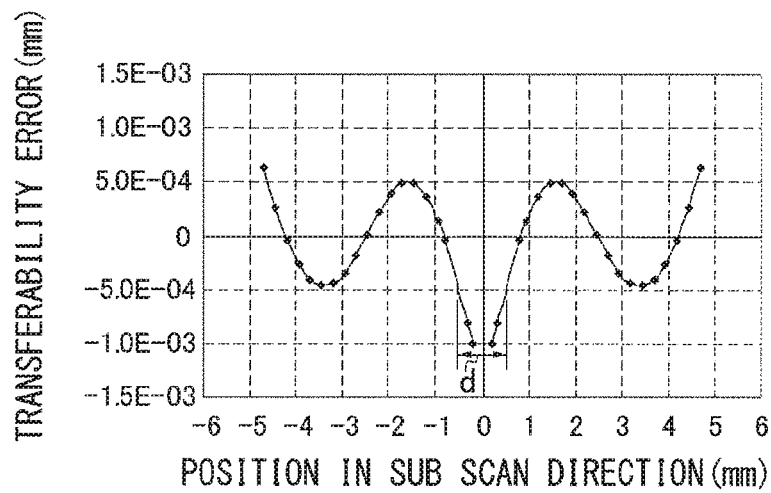
FIGS. 8A, 8B show the results of measuring transferability errors in the position of the optical surface of the fθ lens in sub scan direction.

Further, when the thickness "a" in sub scan direction is 13.4 mm and the thickness "b" along the optical axis is 14.0 mm, the length "d" of a local contraction around the optical ineffective portion is about 1.0 mm, as shown in FIG. 8A. Also, when the thickness "a" in sub scan direction is 5.0 mm and the thickness "b" along the optical axis is 14.0 mm, the length "d" is almost zero, as shown in FIG. 8B.

Figure 8B:
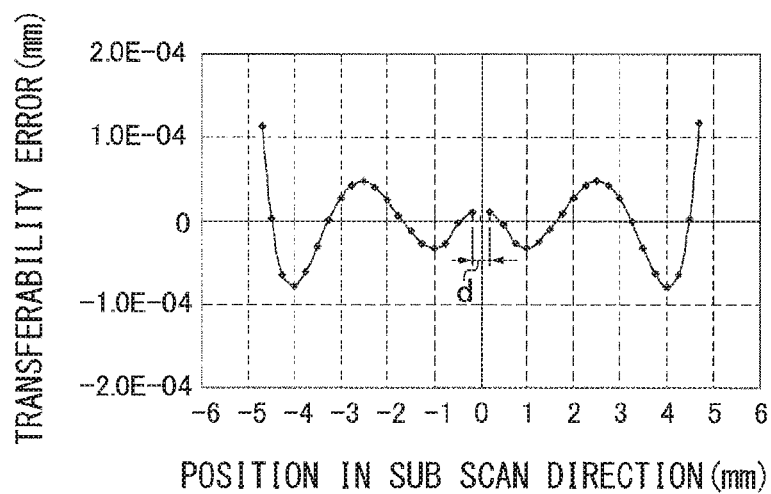

In the graphs of FIGS. 8A, 8B, the abscissa axis shows the position in sub scan direction on exit surface while the longitudinal axis shows transferability error. The positive and negative sides of the graphs correspond to the directions indicated by the arrows in the fθ lens in FIG. 6B. The zero position in sub scan direction is the center of the optical ineffective portion.

From the results of the actual molding and simulation in FIG. 6, it is found that a relation, the thickness "d"=0.3X−1.1 holds between the length "d" of a local contraction and the function X (=(a*b)/(a+b)).

Figure 9A:
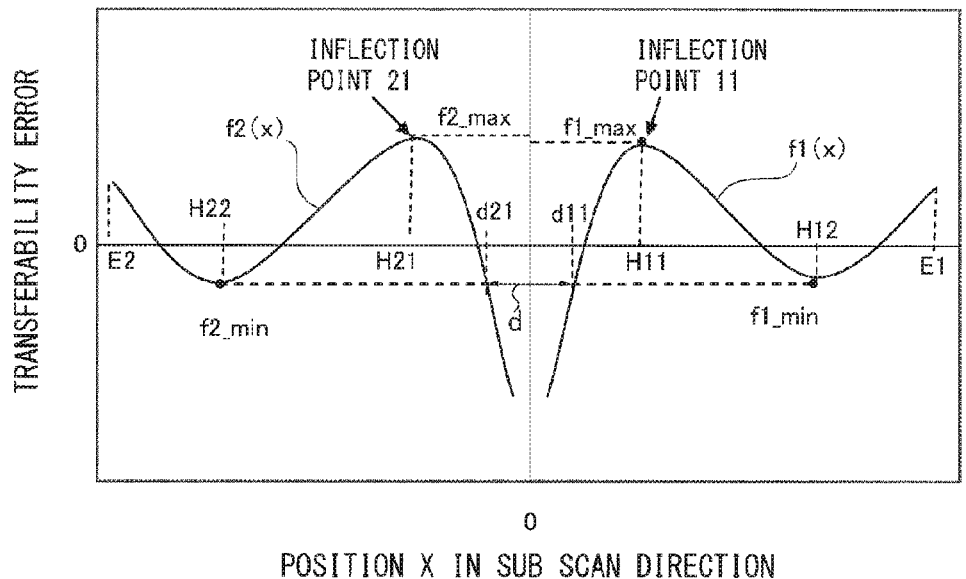
FIGS. 9A, 9B are graphs showing the transferability error represented by a function of the position in sub scan direction.

FIG. 9A is a graph showing the transferability error represented by the functions f1(x) and f2(x) of the position of the optical surface in sub scan direction. The graph shows the positions H11, H21 in sub scan direction of the inflection points 11, 21 closest to the optical ineffective portion, both ends E1, E2 of the optical surface, transferability errors f1(x), f2(x) between the positions H11, H21 and both ends E1, E2, and the maximal and minimal values of the transferability error f1_max, f2_max, f1_min, f2_min, respectively.

The length "d" of a local contraction is defined to be a range of the positions X in sub scan direction which satisfies either f1(x)≥f1_max, f2(x)≥f2_max or f1(x)≤f1_min, f2(x)≤f2_min. This is described in detail below, referring to FIG. 9A.

(1) The f1(x) is that the position X in sub scan direction ≥0. In the range of H11≤X≤E1, the maximal value f1_max is obtained at X=H11 while the minimal value f1_min is obtained at X=H12.

The range of the position X in sub scan direction satisfying either f1(x)≥f1_max or f1(x)≤f1_min is given by X≤d11 where d11 is the position X at f1(x)=f1_min.

Thus, in the f1(x), the length d of a local contraction is given by the position X≤d11.

(2) Likewise, in the f2(x) that the position X in sub scan direction ≤0, the length d is given by X≥d21.

Accordingly, the length d of a local contraction which occurs at the portion of the two optical effective portions near the optical ineffective portion is defined by d21≤X≤d11.

Figure 9B:
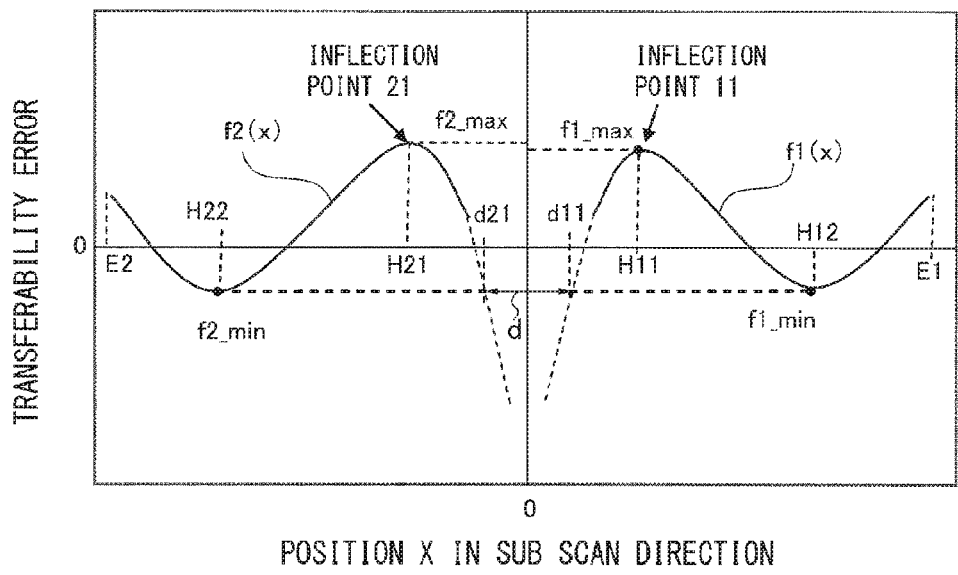

In FIG. 9B the transferability error around the optical ineffective portion is indistinctive. In such a case the transferability error in a broken line portion of f1(x), f2(x) can be estimated on the basis of existing error data obtained from experimental data to find the length d of a local contraction.

Figure 10A:
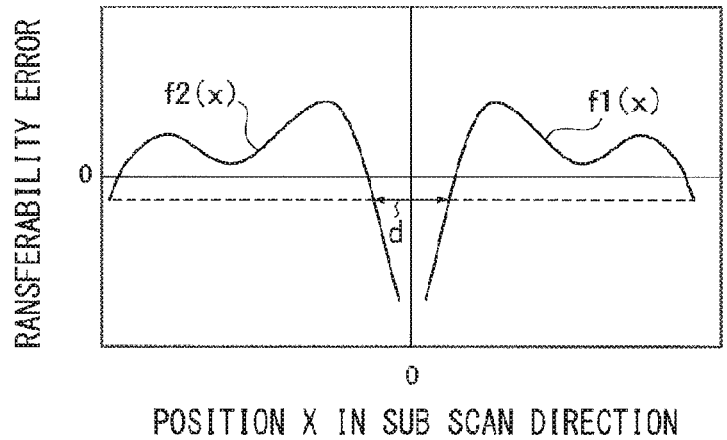
FIGS. 10A to 10C show three patterns of transferability error.
Figure 10B:
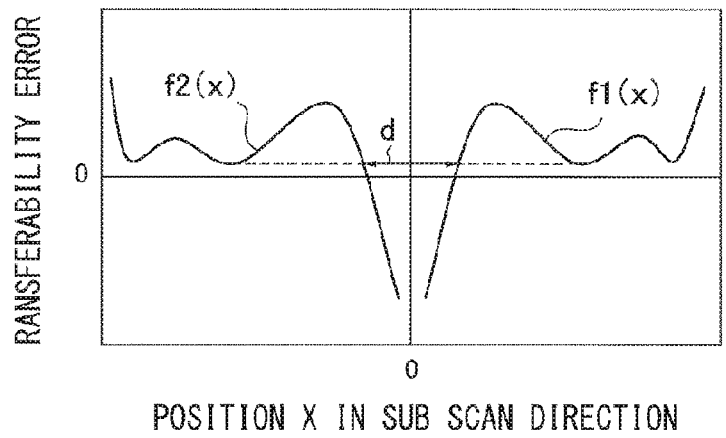
Figure 10C:
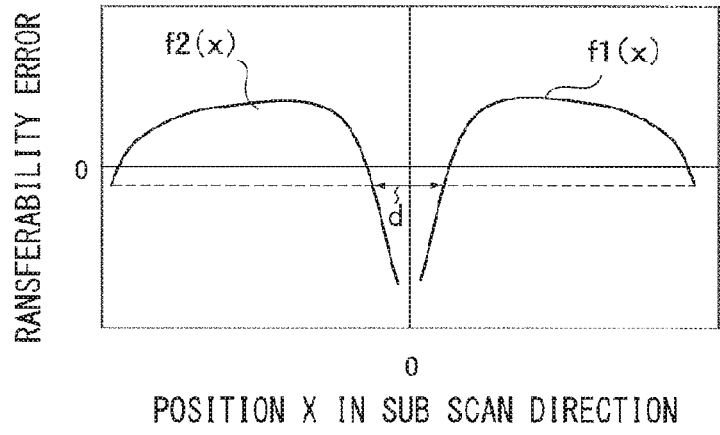

Note that FIG. 9A shows the cubic function of the transferability error with two inflection points. However, the order of function is not limited thereto. For example, the length d of a local contraction can be also found from the patterns of transferability error shown in FIGS. 10A to 10C.

Figure 16B:
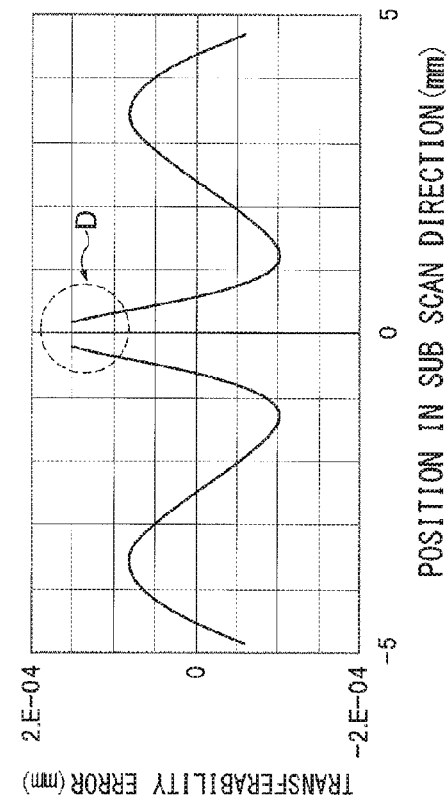
FIG. 16A is a side view of a prior art plastic optical element having two optical effective portions and an optical ineffective portion on incidence side and FIG. 16B is a graph showing the result of measuring transferability errors in the position of the optical surface in sub scan direction
Figure 16A:
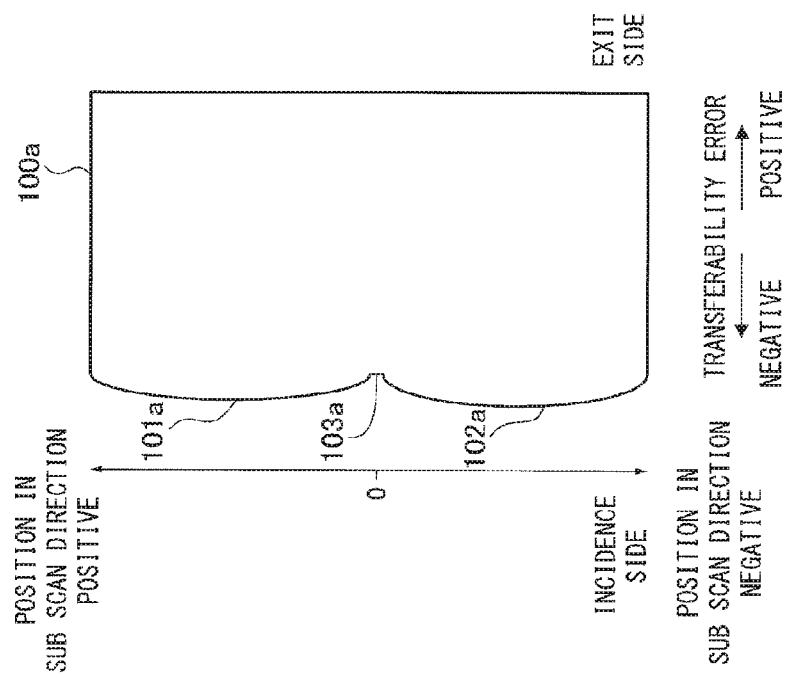

Further, the above is applicable to the plastic optical element including the optical ineffective portion and two optical effective portions on incidence surface shown in FIG. 16A.

Referring back to FIG. 6 showing the results of the actual molding and simulation, a local contraction occurred in an area a1. Therefore, if the optical surface is placed in this area a1, that is, the length Y of the optical ineffective portion is set to satisfy Y≤0.3(a*b)/(a+b)−1.1, a local contraction occurs in the portion of the optical surface near the optical ineffective portion and the mold transferability thereof decreases.

Meanwhile, the area a2 in FIG. 6 is free from a local contraction. Accordingly, to prevent a decrease in the mold transferability, the optical surface has to be placed in the area a2 or the length Y of the optical ineffective portion has to be set to satisfy Y>0.3(a*b)/(a+b)−1.1.

Thus, it is made possible to prevent a decrease in the mold transferability of the optical surface of the fθ lens 24 and accurately form a lens shape by setting the length of the optical ineffective portion 24c to satisfy the above relation (1). This can improve the optical characteristics of the portion of the optical effective portions 24a, 24b near the optical ineffective portion 24c and improve the shape of beam spots on the target scan surface.

Accordingly, the image forming device 1 comprising the optical scanner 20 with the fθ lens 24 can scan the surfaces of the photoreceptor drums with beam spots of accurate shape and generate high-quality images.

Second Embodiment

Figure 11:
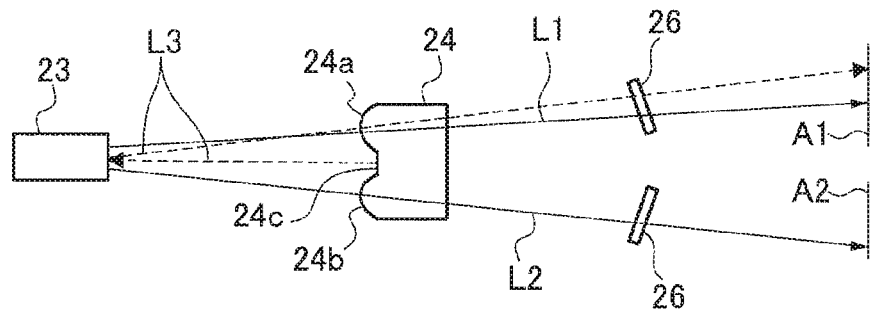
FIG. 11 shows a ghostly light which transmits through the optical effective portion of the fθ lens and reaches a target scan surface.

FIG. 11 shows an fθ lens with two optical effective portions 24a, 24b and an optical ineffective portion 24c therebetween on an incidence surface (close to the optical deflector 23).

The optical ineffective portion 24c is subjected to processing such as surface roughening to have lower reflectivity than that of the surfaces of the optical effective portions 24a, 24b. The rest of the configuration of the fθ lens 24 is the same as that of the first embodiment.

In FIG. 11 two light beams L1, L2 are reflected by the optical deflector 23, and obliquely incident on the surface of the optical effective portions 24a, 24b, transmit through the optical effective portions 24a, 24b and the optical element 26 and reach the target scan surfaces A1, A2.

A part of the reflected light beams by the optical deflector 23 is reflected by the surface of the optical ineffective portion 24c. A reflected light beam L3 is incident on the optical deflector 23 and reflected thereby again to become a ghostly light reaching the target scan surface A1 through the optical effective portion 24a and the optical elements 26. This ghostly light disadvantageously affects scanning on the target scan surface A1.

Further, with the two optical effective portions 24a, 24b set with a shorter interval or a smaller fθ lens 24 in size, the ghostly light is more likely to occur. However, the optical ineffective portion 24c with a lower reflectivity can prevent the occurrence of ghostly light. This makes it possible to constantly scan the target scan surface A1 with precision.

Third Embodiment

Figure 12:
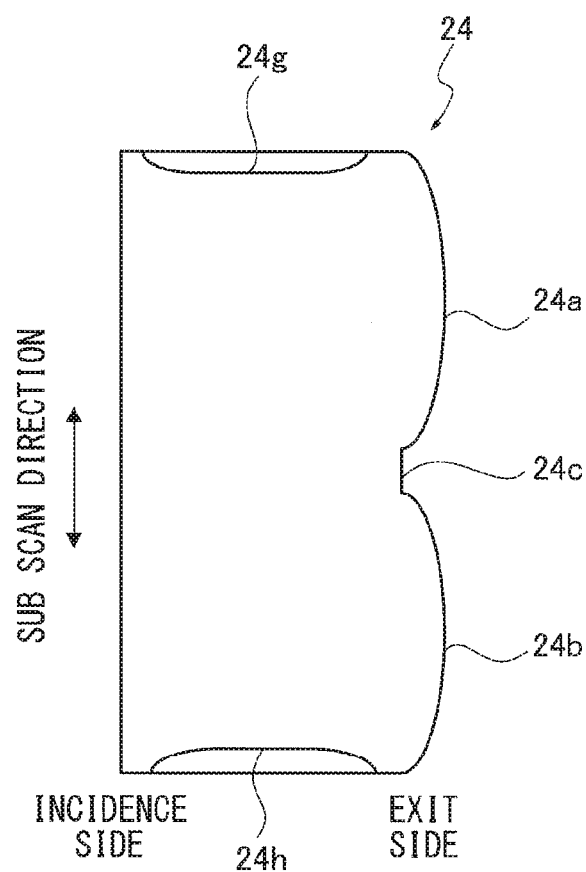
FIG. 12 is a side view of the essential part of an fθ lens in sub scan direction according to a third embodiment.

FIG. 12 shows an fθ lens 24 with concave portions 24g, 24h on both sides (top and bottom surfaces in the drawing) in the sub scan direction according to a third embodiment. The rest of the configuration of the fθ lens 24 is the same as that in the first embodiment. Note that a concave portion can be provided on either of the surfaces.

Now, the manufacturing method of the fθ lens having the concave portions 24g, 24h in FIG. 12 is described with reference to FIGS. 13A, 13B and FIGS. 14A, 14B.

Figure 13A:
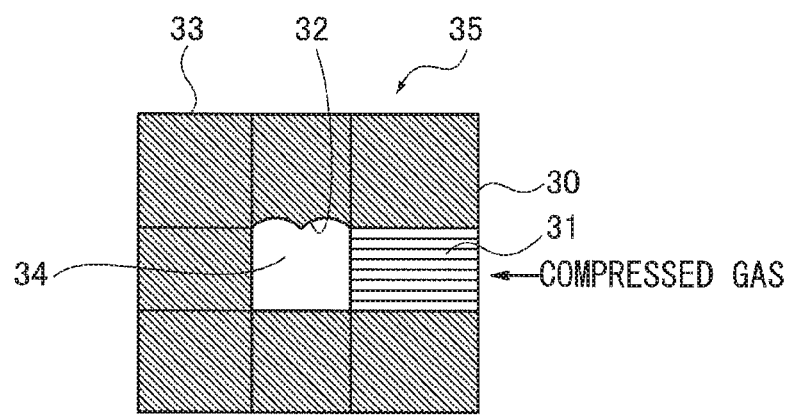
FIGS. 13A, 13B show a manufacturing method of the fθ lens according to the third embodiment.
Figure 13B:
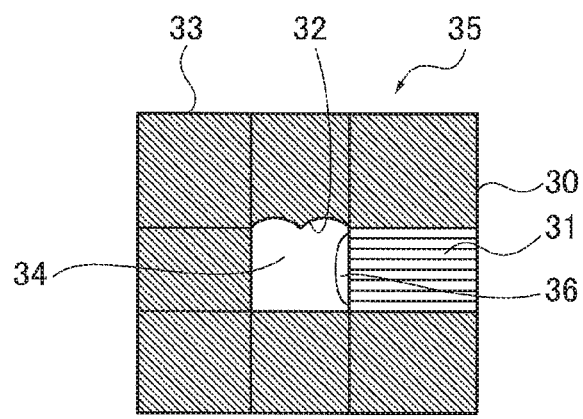

FIGS. 13A, 13B show how to form a concave portion or incomplete transfer surface by applying compressed gas and incomplete transfer to resin at molding.

In detail a cavity piece 30 to form surfaces including a non-transfer surface are formed with at least one air vent 31 and at least one port (not-shown) in communication with the air vent to apply compressed gas to a molded product. A compressed gas supplying machine (not shown) is coupled with the communication port to create a pair of molds 35 having a transfer surface 32 and at least one cavity 34 formed by a cavity piece 33.

Then, the molds 35 are heated at less than a resin softening temperature, and a melted resin is filled into the mold by injection. The resin is closely attached onto the transfer surface 32 by generating pressure from the resin. Then, when the melted resin is cooled down to the resin softening temperature or less, the resin in the cavity 34 is applied with compressed gas from the air vent 31 to forcibly form a space 36 between the cavity piece 30 and the resin to create a concave portion as shown in FIG. 13B.

Figure 14A:
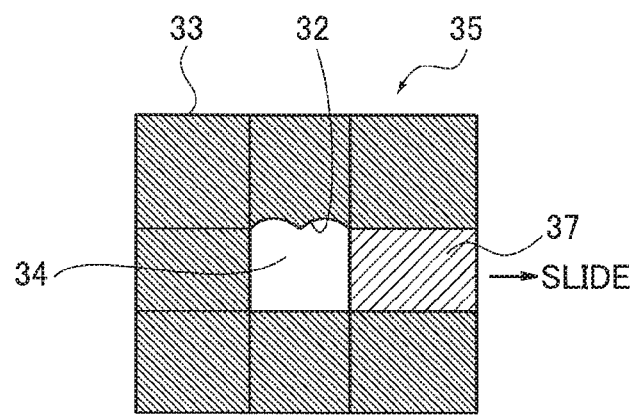
FIGS. 14A, 14B show another example of the manufacturing method of the fθ lens.
Figure 14B:
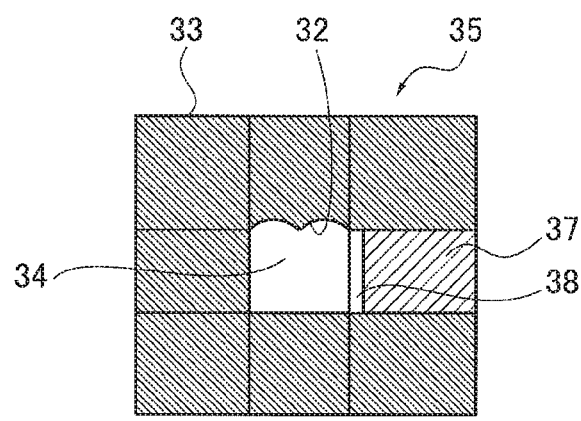
Figure 15B:
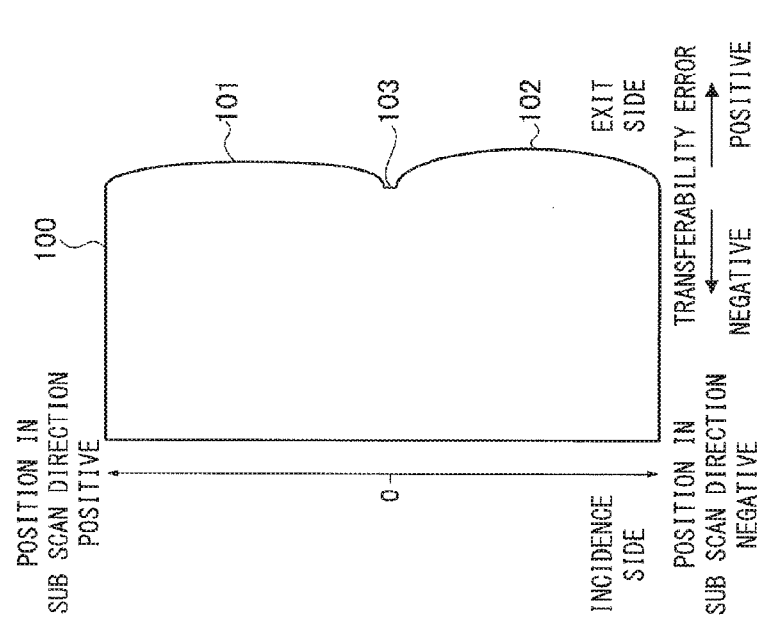
FIG. 15A is a side view of a prior art plastic optical element having two optical effective portions and an optical ineffective portion on exit side and FIG. 15B is a graph showing the result of measuring transferability errors in the position of the optical surface in sub scan direction.
Figure 15A:
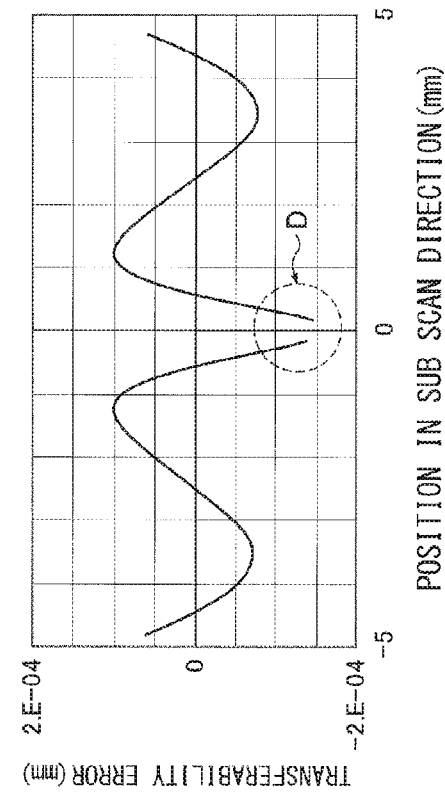

Moreover, FIGS. 14A, 14B show how to form a non-transfer surface by sliding a cavity piece and incomplete transfer at molding.

In detail a cavity piece 37 to form a surface with a concave portion is slid to create the pair of molds 35 having the transfer surface 32 and at least one cavity 34 formed by the cavity piece 33.

Then, the molds 35 are heated at less than a resin softening temperature, and a melted resin is filled into the molds by injection. The resin is closely attached onto the transfer surface 32 by generating pressure from the resin. Then, when the melted resin is cooled down to the resin softening temperature or less, the cavity piece 37 is slid to separate from the resin to forcibly form a space 38 between the cavity piece 37 and the resin to create a concave portion as shown in FIG. 14B.

Likewise, the concave portion can be formed on the other surface in the above manner. Thus, the fθ lens 24 as plastic optical element with the concave portions 24g, 24h in FIG. 12 can be produced.

The concave portions 24g, 24h on both surfaces can help eliminate remnant inner pressure in the resin and inside distortion at molding to create resin-molded products with high precision. Furthermore, since the incomplete transfer portion becomes a concave portion in accordance with the pressure from the resin, the inner pressure in the resin and inside distortion can be prevented from occurring even in the portions susceptible to these problems. Also, contraction occurs mostly on the concave portion so that transferability error in the optical surface can be decreased.

Accordingly, additionally provided with the concave portions 24g, 24h on both surfaces in sub scan direction, the fθ lens 24 can be shaped with high precision. In particular, even fθ lenses in large thickness or uneven thickness can be produced from resin with high precision at about the same costs as those of fθ lenses in small thickness.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A plastic optical element for an optical system of an optical scanner comprising:
   a plurality of optical effective portions through which a plurality of light beams transmit, respectively, formed on at least one of an incidence surface and an exit surface in a sub scan direction; and
   an optical ineffective portion formed between neighboring optical effective portions not to allow the light beams to transmit therethrough, and including an area in which a local contraction occurs at a time of resin molding,
   wherein the optical ineffective portion is set to have a length in the sub scan direction to satisfy the following relation:

$$Y > 0.3(a*b)/(a+b) - 1.1$$

where Y is the length, a is a thickness of the plastic optical element in the sub scan direction, and b is a thickness of the plastic optical element along an optical axis.

2. The plastic optical element according to claim 1, wherein
   the optical ineffective portion is formed by surface processing to have a reflectivity lower than that of the optical effective portions.

3. The plastic optical element according to claim 1, further comprising
   a concave portion on at least either of two edge surfaces in the sub scan direction.

4. The plastic optical element according to claim 1, wherein
   the plastic optical element is an fθ lens.

5. An optical scanner comprising:
   a plurality of light sources;
   an optical deflector to deflect a plurality of light beams emitted from the light sources; and
   an optical system including the plastic optical element according to claim 1, to guide the light beams to scan surfaces, respectively.

6. An image forming device comprising:
   a plurality of photoreceptors; and
   the optical scanner according to claim 5, to scan and expose surfaces of the photoreceptors.

7. A plastic optical element for an optical system of an optical scanner comprising:
   a plurality of optical effective portions through which a plurality of light beams transmit, respectively, formed on at least one of an incidence surface and an exit surface in a sub scan direction; and
   an optical ineffective portion formed between neighboring optical effective portions not to allow the light beams to transmit therethrough, and including an area in which a local contraction occurs at a time of resin molding, wherein the optical ineffective portion is set to have a length in the sub scan direction to satisfy the following relation:

$$Y > 0.3(a*b)/(a+b) - 1.1$$

where Y is the length, a is a thickness of the plastic optical element in the sub scan direction, and b is a thickness of the plastic optical element along an optical axis, and wherein the plastic optical element is an fθ lens.

* * * * *